Patented Apr. 8, 1941

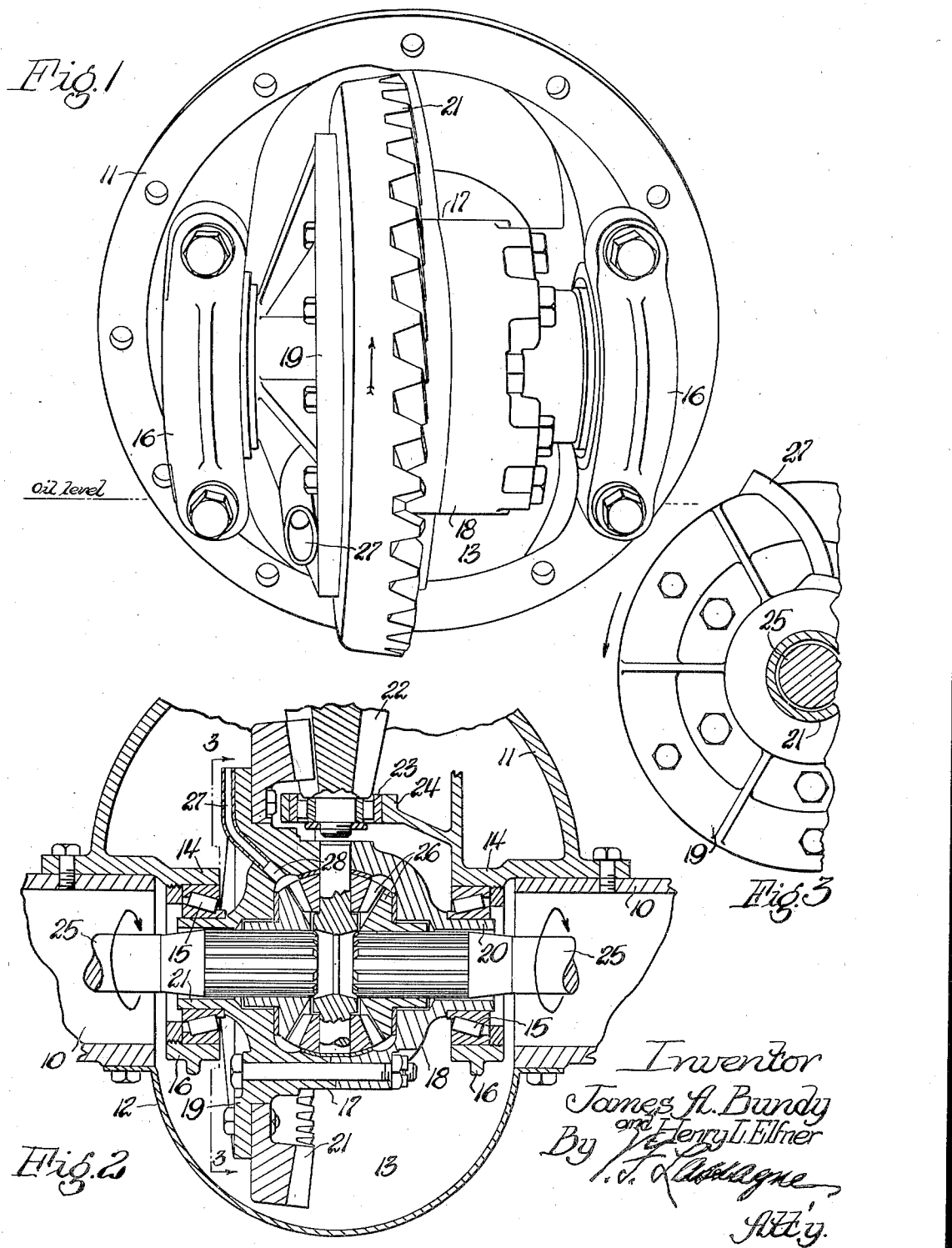

2,237,900

UNITED STATES PATENT OFFICE 2,237,900

LUBRICATING MEANS FOR DRIVING MECHANISMS

James A. Bundy and Henry L. Elfner, Fort Wayne, Ind., assignors to International Harvester Company, a corporation of New Jersey Application December 20, 1937, Serial No. 180,687

5 Claims. (Cl. 184—13)

This invention relates to lubricating means for a driving mechanism, and more particularly to a final driving mechanism of the differential axle type used in automotive vehicles.

A common difficulty is experienced, for example, in rear axle differentials in properly lubricating the differential driving gears within the differential casing. As is well understood by those skilled in the art, the central portion of a rear axle is provided with a housing structure which includes a lubricant reservoir. The differential driving mechanism comprises a casing including a ring gear rotatably carried by antifriction bearings in the housing structure. The ring gear is driven by a driving pinion, and in ordinary differential constructions, the ring gear and casing operate partially in lubricant contained in the lubricant reservoir in the housing structure. Differential drive gearing is contained in this rotatable casing, said drive gearing being splined or otherwise connected to oppositely extending axle or drive shafts. The only provision for lubricating the interior of the casing and the differential gearing contained therein was through a plurality of openings formed in the casing, through which lubricant entered. The lubrication of the supporting bearings was provided for by the splashing of a certain amount of lubricant thereover as the casing and ring gear rotated. However, as the lubricant level in the reservoir became lowered, because of continued use over a prolonged period, positive lubrication of vital parts of the differential could not be depended upon.

Another difficulty encountered, regardless of the lubricant level, resulted from the fact that, when the differential mechanism is operated at low speeds, splashing is insufficient, and, at high speeds, the lubricant is thrown off centrifugally.

The principal object of the invention, then, is to provide means for positively lubricating the enclosed operating parts of a differential.

Another important object is to provide means adapted to receive lubricant from the lubricant reservoir as the casing rotates, said means communicating with the interior of the casing, whereby the lubricant received by said means will be conveyed to the driving mechanism or gearing within the casing.

Still another object is to provide a coordination between said means and the interior of the casing in a manner providing for the escape of lubricant to the supporting bearings, whereby said bearings will be properly lubricated.

And, still another object is to provide the means in such a shape and manner as to insure proper, efficient and positive lubrication of the entire differential assembly.

Briefly, these and other desirable objects may be attained in the following description of one particular embodiment of the invention, as follows:

The ordinary casing is substantially enclosed, except for an opening, which communicates with a lubricant receiving means or tube associated with one side thereof. The tube is curved toward the direction of rotation of the casing substantially radially and circumferentially outward therefrom. In this manner, the tube is adapted to receive lubricant from the reservoir as the casing rotates, thus conveying said lubricant centripetally to the interior of the casing to lubricate the drive or differential gearing contained therein, said lubricant then escaping along the axle shafts to lubricate the supporting bearings.

A more complete understanding of the objects and operation of the invention may be had from the following detailed description taken in conjunction with the accompanying sheet of drawings, in which:

Figure 1 is a perspective view of the central portion of a more or less conventional rear axle structure showing the location of the lubricant receiving means with respect to the rotatable casing and ring gear;

Figure 2 is a plan, sectional view, showing in detail the relation between the lubricant receiving means and the component parts of the differential assembly; and, Figure 3 is a side elevational view of a portion of the rotatable casing taken on the line 3—3 of Figure 2, showing generally a preferred type of lubricant receiver.

The external structure of the axle assembly as shown in the drawing is more or less conventional and includes a pair of oppositely extending axle housing portions 10, intermediate the inner ends of which is secured a differential housing structure 11. As best shown in Figure 2, a hemisphrical cover 12 is secured to the axle housings 10 and with the portion 11 forms the conventional central or banjo housing portion. It will be understood that this banjo housing portion, including the housing 11 and the cover 12, substantially encloses the central portion of the assembly, and forms a lubricant reservoir 13. The portion 11 is provided with laterally spaced supporting portions 14 adjacent the inner ends of each axle housing 10, respectively. Antifriction bearings 15 are carried by these supporting portions 14 and are secured therein by bearing caps 16.

A differential casing 17, preferably formed in two parts 18 and 19, is rotatably carried by the spaced bearings 15 by sleeve portions 20 and 21 formed on the casing portions 18 and 19, respectively. The casing portion 19 is provided with an annular flange to which is secured for rotation therewith, a ring gear 21. The ring gear and casing are driven by a bevel pinion 22 rotatably carried by an antifriction bearing 23 supported in a bearing supporting portion 24 formed integral with the housing portion 11. The bevel pinion 22 is driven by the usual propeller shaft, not shown.

A pair of axle or jack-shafts 25 extend respectively through each of the axle housing portions 10 and through each of the sleeve portions 20 and 21 formed on the casing portions 18 and 19, respectively. These axles are supported at their outer ends in any suitable manner, not shown, and drive the usual drive wheels, also not shown. At their inner ends, the axles 25 are preferably splined and connected in driving relation with differential gearing 26 of a more or less conventional type.

It will be understood that the differential casing structure 17 substantially encloses the differential gearing 26 and the inner ends of the axle shafts 25. In most conventional constructions, the differential casing is provided with openings through which lubricant may enter to lubricate the differential gearing. In the present instance, as shown in a preferred embodiment of the invention illustrated in the drawing, lubricant is carried in the reservoir substantially at a height indicated by the oil level line shown in Figure 1. In order to provide for the transfer of lubricant from the lubricant reservoir 13 to the interior of the differential casing 17, means have been provided in the form of a lubricant receiving member or tube 27 secured to or otherwise associated with the casing 17 for rotation therewith. This lubricant receiver or tube 27 extends substantially radially and circumferentially outwardly, being curved toward the direction of rotation of the casing, as best indicated in Figure 3. This member 27 is preferably fitted into an opening 28 formed in the casing portion 19, substantially adjacent a central point thereof. In the present disclosure of the invention, the outermost end of the member 27 terminates substantially at the periphery of the flange formed on the casing member 19 and is cut at a slight angle to increase the size of the opening in said member. It will be understood, of course, that, while the lubricant receiving member 27 has been shown in the form of a tube, any form of means providing a passage for conveying lubricant to the interior of the casing 17 will serve the same purpose.

In the operation of the rear axle assembly, the casing assembly and ring gear rotate in the direction of the arrows in Figures 1 and 3. The lubricant receiving member 27, being curved toward the direction of rotation, dips into the lubricant in the lubricant reservoir 13 as the assembly rotates. Continued rotation of the assembly, of course, results in more lubricant being picked up by the member 27, which lubricant is conveyed centripetally to the interior of the casing to lubricate the differential gearing 26. Centrifugal action holds the lubricant to the inner peripheral walls of the casing and in this manner the casing gradually fills up with lubricant. When the casing is substantially filled, the lubricant escapes in opposite directions along the axle shafts 25 and especially along the splined portions thereof. The lubricant then runs off the outer end of the sleeve portions 20 and 21 and is retained by the bearing supporting portions 14 and the bearing caps 16. In this manner, the antifriction bearings 15 are properly lubricated.

From the foregoing description, it will be seen that certain external portions of the differential assembly operate continually in the lubricant in the reservoir, and certain other portions, such as the bevel pinion 22 and the antifriction bearing 23, are lubricated by the more or less conventional splash principle. As provided in the present invention, however, the conventional splash principle is supplemented by the lubricant receiving member 27, which receives lubricant from the reservoir and positively lubricates the differential gearing enclosed by the casing assembly 17. The antifriction bearings 15 are also positively lubricated in the same manner as lubricant escapes outwardly from the interior of the casing, as hereinbefore described.

It will be appreciated that certain inherent advantages are present in the preferred form of the invention illustrated and described, and that none of these advantages will be sacrificed by certain obvious alterations that may be made in the construction, that fall within the scope of the appended claims.

What is claimed is:

1. In a driving mechanism including housing structure having a lubricant reservoir, a rotatable, closed casing operating within said housing structure and in lubricant in the reservoir, power transmitting mechanism within the casing, the casing being formed with a shaft opening and a shaft closely fitting and extending through the opening and driven by the power transmitting mechanism, the combination with the casing of a lubricant receiving member carried thereby for rotation therewith and communicating with the interior thereof, said member receiving lubricant intermittently from the reservoir as the casing rotates and constituting the sole means for conveying said lubricant to the power transmitting mechanism, the closed casing confining lubricant therein against escape other than between the shaft and shaft opening.

2. In a driving mechanism including housing structure having a lubricant reservoir, a rotatable, closed casing having a radial face and operating within said housing structure and in lubricant in the reservoir, said casing having an aperture therein, power transmitting mechanism within the casing, the casing being formed with a shaft opening and a shaft closely fitting and extending through the opening and driven by the power transmitting mechanism, the combination with the casing of a lubricant receiving member fitted in the aperture therein and carried thereby for rotation therewith and communicating through the aperture with the interior thereof, said member having a portion thereof lying closely adjacent the radial face of the casing and extending substantially toward the direction of rotation of the casing, said member receiving lubricant intermittently from the reservoir as the casing rotates and conveying and directing said lubricant to the power transmitting mechanism, the closed casing confining lubricant therein against escape other than between the shaft and shaft opening.

3. In a driving mechanism including housing structure having a lubricant reservoir, a rotatable, closed casing operating within said housing structure and in lubricant in the reservoir, power transmitting mechanism within the casing, the casing including a shaft opening, and a shaft closely fitting and extending through the opening and driven by the power transmitting mechanism, the combination with the casing of a member rigidly carried thereby and extending toward the direction of rotation thereof substantially radially and circumferentially outwardly from a point adjacent the center thereof to a point adjacent the periphery thereof, said member being formed with a passage communicating with the interior of the casing at the aforesaid central point, said member constituting the sole means for receiving lubricant from the reservoir as the casing rotates, said member conveying said lubricant centripetally to the power transmitting mechanism, the closed casing confining the lubricant therein against escape other than between the shaft and shaft opening.

4. In a driving mechanism including housing structure having a lubricant reservoir, a rotatable, closed casing having a radial face and operating within said housing structure and in lubricant in the reservoir, said casing having a portion substantially axially spaced inwardly of the radial face and having an aperture therein adjacent a central portion thereof, power transmitting mechanism within the casing including parts adjacent the last named casing portion, the casing being formed with a shaft opening and a shaft closely fitting the opening and extending from the casing and driven by the power transmitting mechanism, the combination with the casing of a lubricant receiving and directing member carried thereby for rotation therewith and communicating through the aforesaid aperture with the interior of the casing and with the power mechanism parts, said member having a portion extending substantially axially outwardly from the aperture, and a connected portion extending substantially radially of the casing toward the direction of rotation of the casing and lying closely adjacent the radial face portion thereof, said member receiving lubricant from the reservoir as the casing rotates and conveying and directing said lubricant substantially radially and axially inwardly through the aforesaid aperture to the power transmitting mechanism, the closed casing confining the lubricant therein against escape other than between the shaft and shaft opening.

5. In an axle driving mechanism including a housing structure adapted to contain lubricant, a closed casing having a radial face and including a ring gear rotatably carried by spaced bearings in the housing structure and operating in the lubricant, said casing being formed with an inwardly spaced portion having an aperture adjacent a central portion thereof, differential gearing carried in the casing and having parts closely adjacent said aperture, the casing being formed with axle openings, and a pair of axles closely fitting and extending respectively through the openings of the casing and driven by the differential gearing, the sides of the casing closely fitting the axles, the combination with the casing of a tube fitted into the aperture therein and carried thereby and communicating through the aperture with the interior of the casing and with the gearing, said tube extending axially outwardly and being curved radially outwardly from said aperture toward the direction of rotation of the casing, said tube receiving lubricant as the casing rotates and conveying and directing said lubricant through the aperture to the differtial gearing, the closed casing confining the lubricant therein against escape other than between the axles and axle openings.

JAMES A. BUNDY.
HENRY L. ELFNER.